United States Patent [19]

Kobold

[11] Patent Number: 4,708,166

[45] Date of Patent: Nov. 24, 1987

[54] CONTROL VALVE FOR AUTOMATICALLY MAINTAINING A CONSTANT FLUID FLOW RATE

[76] Inventor: Klaus Kobold, Sodener Strasse 120, 6230 Kelkheim, Fed. Rep. of Germany

[21] Appl. No.: 890,949

[22] Filed: Jul. 31, 1986

[30] Foreign Application Priority Data

Feb. 22, 1986 [DE] Fed. Rep. of Germany ... 8604762[U]

[51] Int. Cl.$^4$ ................................. G05D 7/01
[52] U.S. Cl. .................. 137/512.1; 137/504; 137/517; 137/859; 138/45
[58] Field of Search ............ 137/504, 512.1, 517, 137/859; 138/45

[56] References Cited

U.S. PATENT DOCUMENTS

| | | | |
|---|---|---|---|
| 2,615,675 | 10/1952 | Mellert | 137/498 |
| 2,928,414 | 3/1960 | Streeter | 137/517 |
| 2,938,538 | 5/1960 | Allen | 137/516.25 X |
| 2,941,544 | 6/1960 | Peras | 137/517 X |
| 2,960,109 | 11/1960 | Wilson | 137/517 |
| 3,110,527 | 11/1963 | Fox | 138/45 X |
| 4,424,936 | 1/1984 | Marc | 138/45 X |

FOREIGN PATENT DOCUMENTS 1136118 5/1957 France ................... 138/45

*Primary Examiner*—Robert G. Nilson
*Attorney, Agent, or Firm*—Wenderoth, Lind & Ponack

[57] ABSTRACT

A control valve for automatically maintaining a constant rate of flow of a fluid through a pipeline includes a housing having therethrough a passage including an inlet opening and an outlet smaller than the inlet opening. An orifice plate is positioned within the passage adjacent the outlet opening, the orifice plate having therethrough an orifice. A regulating diaphragm is positioned within the passage at a location upstream of the orifice plate. The regulating diaphragm has therethrough circumferential ports and a central opening smaller than the orifice. The regulating diaphragm is formed of an elastic material such that the regulating diaphragm is deflectable toward the orifice plate in response to pressure differences across the control valve between a maximum deflected position, whereat the regulating diaphragm abuts the orifice plates, thereby closing the circumferential ports, and fluid flow is restricted by the central opening, and various positions whereat the regulating diaphragm is spaced from the orifice plate, thereby allowing fluid flow through the circumferential ports.

18 Claims, 6 Drawing Figures

CONTROL VALVE FOR AUTOMATICALLY MAINTAINING A CONSTANT FLUID FLOW RATE

BACKGROUND OF THE INVENTION

The present invention relates to a control valve for automatically maintaining a constant rate of flow of a fluid through a pipeline.

In almost every branch of industry pipeline systems for fluids, such as water or gases, are in use. Varying amounts of such fluids are removed from the pipeline systems, and this leads to pressure fluctuations within the system. In order to control the flow rate of the fluid through the pipeline so that the flow rate remains constant, it has been required to provide manual control valves or regulating devices which are controlled by means of measuring instruments. When such measuring instruments are employed however, the pipeline on both sides thereof must be maintained straight. To obtain optimum operating behavior of the pipeline systems, it is necessary to conduct lengthy, frequently inaccurate adjustment procedures for small plants, and larger plants can be adjusted only with costly regulating devices. In order to maintain a constant flow through a pipeline system, it therefore disadvantageously is necessary first of all to measure the flow and then to pass on information from such measurements to a control valve which is opened or closed as necessary. This requires auxiliary equipment.

It also has been proposed to employ a rigid diaphragm disk and a rubber or other compressible regulating disk arranged in a control valve consecutively in the direction of flow, to attempt to automatically maintain constant a fluid flow rate. Under the pressure of the fluid and with axial displacement, the rigid diaphragm disk is pressed against the regulating disk, as a result of which the cross section of a flow opening in the regulating disk is varied, depending on the pressure difference across the control valve. This type of control valve however does not maintain a satisfactorily constant flow and cannot be used for certain media, particularly aggressive media which would adversely effect the material, such as rubber, of the regulating disk. Furthermore, such material of the regulating disk is subject to aging, so that with time the function of the control valve suffers.

SUMMARY OF THE INVENTION

Accordingly, it is an object of the present invention to provide a control valve for automatically maintaining a constant rate of flow of a fluid through a pipeline, whereby it is possible to overcome the above and other prior art disadvantages.

It is a further object of the present invention to provide such a control valve whereby the flow rate reliably and automatically is maintained constant at all times, independent of changing pressure differences across the control valve.

These objects are achieved in accordance with the present invention by the provision of a control valve including a housing having therethrough a passage including an inlet opening or end and an outlet opening or end smaller than the inlet opening. An orifice plate is positioned within the passage adjacent the outlet opening, and the orifice plate has therethrough an orifice. A regulating diaphragm is positioned within the passage at a location upstream of the orifice plate, and the regulating diaphragm has therethrough circumferential ports and a central opening smaller than the orifice in the orifice plate. The regulating diaphragm is formed of an elastic material, particularly a non-compressible, flexurally elastic material such as steel, such that the regulating diaphragm is deflectable toward the orifice plate in response to pressure differences across the control valve between a maximum deflected position, whereat the regulating diaphragm abuts the orifice plate, thereby closing the circumferential ports, and the fluid flow is restricted by the central opening, and various positions whereat the regulating diaphragm is spaced from the orifice plate, thereby allowing fluid flow through the circumferential ports in varying degrees in response to such pressure differences. In other words, the regulating diaphragm is deflected under the existing pressure of the fluid through the pipeline or the pressure difference that exists across the control valve, and when the regulating diaphragm is deflected completely into contact with the orifice plate the circumferential ports are closed, but the central opening communicates with the orifice and thereby defines a maximum restriction of flow.

In accordance with the present invention the regulating diaphragm thus is deflected with the pressure difference that exists across the control valve. The regulating diaphragm need not consist of a compressible material such as rubber, but may be manufactured from steel, particularly a high grade steel, or from similar, durable, flexurally elastic materials. The effective valve opening thus is reduced to a minimum when the pressure difference increases to a maximum, or is opened fully when the pressure different decreases to a minimum.

It is not a simple matter to establish the relationship between the pressure difference and the valve opening that is required for a constant flow. Further, it is only the pressure difference and not the absolute pressure which must adjust the valve to the particular opening required. Pressure fluctuations may occur either upstream of or downstream of the valve. For these reasons, in the past there has not been a simple, economic regulating method for maintaining a constant flow. However, in accordance with the present invention, the functions of flow measurement and of controlling the cross section of the valve opening are combined in a manner such that the effective valve opening is more or less opened or closed in direct response to the pressure difference across the valve. Under a load of the most extreme pressure difference (for example of 20 bar) the elastic regulating diaphragm fully abuts the orifice plate, such that only the cross section of the central opening is available for fluid flow, and the valve then operates as a fixed diaphragm. When the pressure difference decreases, the regulating diaphragm retracts accordingly from the orifice plate, thereby freeing a correspondingly larger flow cross section through the circumferential recesses, such being in proportion to the spring characteristics of the regulating diaphragm. Thus, it is ensured that the valve adapts itself automatically to varying pressure relationships and that a perpetually constant amount of fluid flows through the control valve and thereby also through the pipeline in which the control valve is positioned. Neither separate auxiliary equipment nor separate auxiliary energy is required for the control operation.

It is particularly advantageous if the regulating diaphragm consists of at least two elongated elastic metal laminae arranged crosswise with respect to each other and connected in the area of crossing, particularly in the circumference of the central opening. Such connection may be by way of a rivet which defines the central opening. The outer ends of the laminae are clamped within the passage, such that the regulating diaphragm can deflect elastically. The spring characteristics can be adapted to different flow relationships and uses by choosing the metal laminae with respect to material, thickness, shape and clamping.

In any case, each lamina may comprise plural elastic metal members or laminae arranged on top of each other in the manner of a compound leaf spring, this being provided in each direction of the mutually crossing metal laminae. This also makes it possible to advantageously effect or adjust the spring characteristics of the regulating diaphragm.

In accordance with a further refinement of the present invention, each lamina has tapered outer ends, for example triangular or trapezoidal outer ends, and the circumferential ports are defined between adjacent such tapered outer ends. Alternatively, each lamina may have a generally rhomboidal configuration, and the circumferential ports are defined between adjacent outer ends of such rhomboidal laminae. These features of the present invention make it easy to achieve desired spring characteristics, while at the same maintaining desired flow relationships.

In accordance with a further embodiment of the present invention, the regulating diaphragm includes at least one disk-shaped elastic metal lamina having circumferential recesses defining the ports, such circumferential recesses preferably extending inwardly from the periphery of the lamina. Such a metal lamina easily can be manufactured and easily can be installed due to clamping at its outer circumferential edge. Several such undivided, disk-shaped elastic metal laminae which, apart from their circumferential recesses and central openings, cover the flow cross section of the passage through the valve housing, also can be positioned on top of each other in the manner of a compound spring in order thereby to regulate or adjust the spring characteristics.

The elastic material of the regulating diaphragm preferably consists of, for example, steel, particularly high grade steel, or brass having a large elastic elongation.

In accordance with a further feature of the present invention, the orifice plate has a conically recessed upstream side to be contacted by the regulating diaphragm in the maximum deflected position thereof. Particularly, the orifice plate may be in the form of a funnel-shaped member with a substantially uniform wall thickness, with a converging tapered end pointing in the downstream direction, i.e. toward the outlet opening of the valve housing. The conical recess provides a space which is required for the regulating diaphragm to deflect, while the regulating diaphragm and orifice plate have outer circumferences which are clamped together and are axially fixed with respect to the housing. The conical recess furthermore provides that, as the pressure difference and deflection of the regulating diaphragm increase, the necessary reduction in the effective size of the valve opening occurs, until the regulating diaphragm directly abuts the orifice plate and the valve opening is defined only by the central opening in the regulating diaphragm. The outer circumferences of the regulating diaphragm and orifice plate can be clamped by means of a locking ring to axially fix such elements with respect to the valve housing. This ensures that installation and assembly is simple, and particularly also that exchange or replacement of the regulating diaphragm and orifice plate easily can be effected.

The cross sectional size or diameter of the orifice of the orifice plate approximately corresponds to the cross sectional size or diameter of the outlet opening of the valve housing.

The present invention particularly may be employed for a control valve to be used for very large rates of fluid flow. In such an arrangement, the valve housing has therethrough a plurality of passages, and each passage has positioned therein a respective orifice plate and regulating diaphragm. Thus, there are provided a plurality of control valves positioned adjacent each other, for example in a disk-shaped valve housing.

It of course will be understood that to facilitate installation the valve housing can be equipped with external and/or internal threads.

BRIEF DESCRIPTION OF THE DRAWINGS

Other objects, features and advantages of the present invention will be apparent from the following detailed description of preferred embodiments thereof, with reference to the accompanying drawings, wherein.

DETAILED DESCRIPTION OF THE INVENTION

Figure 1:
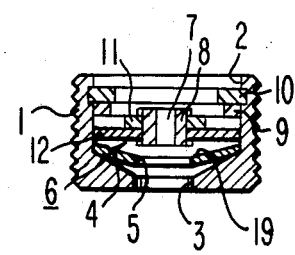
FIG. 1 is an axial sectional view of a control valve according to the present invention.
Figure 2:
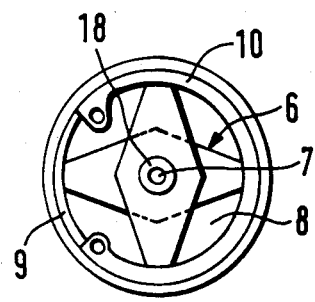
FIG. 2 is a plan view of one embodiment of a control valve according to the present invention.

FIGS. 1 and 2 illustrate a control valve according to a first embodiment of the present invention, the control valve including a valve housing 1 having therethrough a substantially cylindrical passage 2 which defines an inlet opening or end for a fluid and which tapers conically to an outlet end or opening 3. An orifice plate 4 is positioned within the passage adjacent outlet opening 3 and has therethrough an orifice 5. The upstream side of orifice plate 4 is recessed conically at 19. The diameter of orifice 5 is approximately equal to that of outlet opening 3. Positioned within the passage at a location upstream of orifice plate 4 is a regulating diaphragm 6 which is formed of an elastic material, i.e. a non-compressible flexurally elastic material. Regulating diaphragm 6 has therethrough a central opening 7 and circumferential ports 8, as can be seen particularly in FIG. 2. Central opening 7 is smaller than orifice 5 and outlet opening 3. Circumferential ports 8 extend inwardly to positions outwardly of orifice 5. Orifice plate 4 and regulating diaphragm 6 have outer circumferences which are clamped together and maintained in an axially fixed position with respect to housing 1 by means of an intermediate ring 9 and a locking ring 10 (shown in FIG. 2 only). FIG. 1 illustrates the control valve in an open, starting position.

Figure 3A:
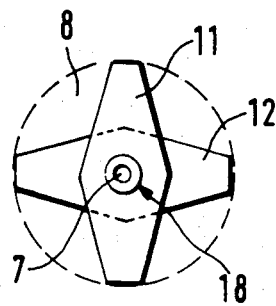
FIGS. 3a to 3c are plan views of different embodiments of regulating diaphragms employable in the control valve of the present invention.

Regulating diaphragm 6 can have a number of different constructions. Thus, as shown in FIG. 3a indicating the arrangement of FIG. 2, regulating diaphragm 6 includes at least two elongated elastic metal laminae 11, 12 arranged crosswise with respect to each other. Specifically, laminae 11, 12 are thin, elastic metal spring elements having generally rhomboidal configurations and are rigidly connected to each other, for example by a connecting rivet 18 which defines central opening 7. Each laminae 11, 12 may be in the form of plural elastic metal members arranged on top of each other in a manner of a compound spring. The ports 8 are defined between adjacent outer ends of the rhomboidal laminae. Alternatively, each lamina may have tapered outer ends, such as triangular, trapezoidal or the like, whereby ports 8 are defined between adjacent such tapered outer ends.

Figure 3B:
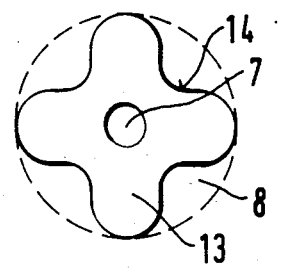

The regulating diaphragm 6 also may be in the form of at least one disk-shaped elastic metal lamina 13 (FIG. 3b) having circumferential recesses 14 defining ports 8, particularly with recesses 14 extending inwardly from the periphery of lamina 13. Opening 7 is provided centrally of lamina 13. In this arrangement, lamina 13 may be in the form of a plurality of elastic metal members arranged one on top of the other in the nature of a compound spring.

Figure 3C:
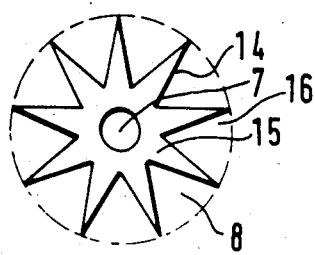

FIG. 3c shows a different embodiment wherein the regulating diaphragm 6 is a one part metal lamina 15 having a central opening 7 and inwardly extending, sector-shaped circumferential recesses 14 defining sports 18 in the form of slots 16.

In all embodiments, regulating diaphragm 6 is formed of an elastic material such that it is deflectable toward orifice plate 4 into the recess 19 in response to the pressure of the fluid, i.e. pressure differences across the control valve, between a maximum deflected position whereat the regulating diaphragm 6 abuts the orifice plate 4, thereby closing circumferential ports 8, whereby fluid flow is restricted by central opening 7, and various positions whereat the regulating diaphragm 6 is spaced from orifice plate 4, thereby allowing corresponding various fluid flows through circumferential ports 8.

The material of the regulating diaphragm 6 is flexurally elastic and non-compressible. Examples of such material are steel, particularly high grade steel, brass or the like with a large elastic elongation. Thin spring band material with a high modulus of elasticity is inexpensive and thereby suitable for regulating diaphragm 6.

The flow rate through the control valve is determined by the pressure difference across valve housing 1, as well as by the size of the effective valve opening. In order to achieve a constant flow rate, the valve opening must close when the pressure difference increases and must open when the pressure difference decreases. In accordance with the present invention, a constant flow rate is achieved by means of the elastic regulating diaphragm 6 which opens or closes the downstream, funnel-shaped orifice plate 4 more or less, depending on the magnitude of the pressure difference. At the most extreme pressure difference, for example of approximately 20 bar, the elastic regulating diaphragm 6 directly and fully abuts orifice plate 4, thereby closing ports 8 so that only central opening 7 is available for flow. In such position, the control valve functions as a fixed diaphragm. When the pressure difference decreases, the regulating diaphragm due to its flexural elasticity, opens a correspondingly larger flow cross section, i.e. of ports 8. The control valve of the present invention thereby adapts itself automatically to different pressure conditions, so that a constant amount of fluid flow always is achieved through the control valve and through a respective pipeline. The control valve of the present invention particularly is suitable for balancing pipe systems, is easy to install and requires only relatively little space. The need for manually movable parts, such as handwheels or valve spindles, as well as the need for electric or pneumatic control lines, is eliminated. The accuracy of the control valve is relatively high and is on the order of ±0.2 l/min.

Figure 4:
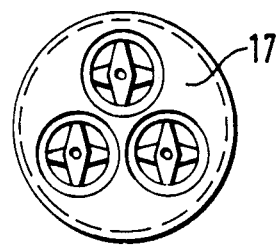
FIG. 4 is a plan view of a multi-valve control valve according to the present invention.

The control valve of the present invention easily can be adapted for use in pipeline systems with very large rates of fluid flow. Thus, for example as shown in FIG. 4, a single, disk-shaped valve housing 17 may be provided with a plurality of control valves as discussed above.

It will be apparent that a very large number of potential uses exist for the control valve of the present invention. Thus, such control valve may be used in pipeline systems in different industries, for example, public health engineering, domestic engineering, heating, air conditioning and refrigeration engineering, as well as in centrifugal pumping and similar systems, wherein it is necessary to maintain a constant flow.

Although the present invention has been described and illustrated with respect to preferred features, it is to be understood that various changes and modifications may be made to the specifically described and illustrated features without departing from the scope of the present invention.

I claim:

1. A control valve for automatically maintaining a constant rate of flow of a fluid through a pipeline, said control valve comprising:
    a housing having therethrough a passage including an inlet opening and an outlet opening smaller than said inlet opening;
    an orifice plate positioned within said passage adjacent said outlet opening, said orifice plate having therethrough an orifice; and
    a regulating diaphragm positioned within said passage at a location upstream of said orifice plate, said regulating diaphragm having therethrough circumferential ports and a central opening smaller than said orifice, said regulating diaphragm being formed of an elastic material such that said regulating diaphragm is deflectable toward said orifice plate in response to pressure differences across said control valve between a maximum deflected position, whereat said regulating diaphragm abuts said orifice plate, thereby closing said circumferential ports, and fluid flow is restricted by said central opening, and positions whereat said regulating diaphragm is spaced from said orifice plate, thereby allowing fluid flow through said circumferential ports, said regulating diaphragm comprising at least two elongated elastic metal laminae arranged crosswise with respect to each other and connected in the area of crossing.

2. A valve as claimed in claim 1, wherein said laminae have outer edges clamped within said passage.

3. A valve as claimed in claim 1, wherein said laminae are connected by a rivet which defines said central opening.

4. A valve as claimed in claim 1, wherein each said lamina comprises plural elastic metal members arranged on top of each other in the manner of a compound spring.

5. A valve as claimed in claim 1, wherein each said lamina has tapered outer ends, and said ports are defined between adjacent said tapered outer ends.

6. A valve as claimed in claim 1, wherein each said lamina has a generally rhomboidal configuration, and said ports are defined between adjacent outer ends of said rhomboidal laminae.

7. A valve as claimed in claim 1, wherein said elastic metal of said laminae comprises brass or a high grade steel having a large elastic elongation.

8. A valve as claimed in claim 1, wherein said orifice plate has a conically recessed upstream side adapted to be contacted by said regulating diaphragm in said maximum deflected position thereof.

9. A valve as claimed in claim 1, wherein outer circumferences of said orifice plate and said laminae are clamped together and axially fixed with respect to said housing.

10. A valve as claimed in claim 1, wherein the diameter of said orifice approximately corresponds to the diameter of said outlet opening.

11. A valve as claimed in claim 1, particularly for large rates of fluid flow, wherein said housing has therethrough a plurality of said passages, and each said passage has positioned therein a respective said orifice plate and regulating diaphragm.

12. A control valve for automatically maintaining a constant rate of flow of a fluid through a pipeline, said control valve comprising:
a housing having therethrough a passage including an inlet opening and an outlet opening smaller than said inlet opening;
an orifice plate positioned within said passage adjacent said outlet opening, said orifice plate having therethrough an orifice; and
a regulating diaphragm positioned within said passage at a location upstream of said orifice plate, said regulating diaphragm having therethrough circumferential ports and a central opening smaller than said orifice, said regulating diaphragm being formed of an elastic material such that said regulating diaphragm is deflectable toward said orifice plate in response to pressure differences across said control valve between a maximum deflected position, whereat said regulating diaphragm abuts said orifice plate, thereby closing said circumferential ports, and fluid flow is restricted by said central opening, and positions whereat said regulating diaphragm is spaced from said orifice plate, thereby allowing fluid flow through said circumferential ports, said regulating diaphragm comprising at least one disk-shaped elastic metal lamina having circumferential recesses defining said ports, said recesses extending inwardly from the periphery of said lamina.

13. A valve as claimed in claim 12, wherein said lamina has outer edges clamped within said passage.

14. A valve as claimed in claim 12, wherein said elastic metal of said lamina comprises brass or a high grade steel having a large elastic elongation.

15. A valve as claimed in claim 12, wherein said orifice plate has a conically recessed upstream side adapted to be contacted by said regulating diaphragm in said maximum deflected position thereof.

16. A valve as claimed in claim 12, wherein outer circumferences of said orifice plate and said lamina are clamped together and axially fixed with respect to said housing.

17. A valve as claimed in claim 12, wherein the diameter of said orifice approximately corresponds to the diameter of said outlet opening.

18. A valve as claimed in claim 12, particularly for large rates of fluid flow, wherein said housing has therethrough a plurality of said passages, and each said passage has positioned therein a respective said orifice plate and regulating diaphragm.

* * * * *